Jan. 6, 1959        H. J. CALDWELL        2,867,139
BORING UNIT
Filed Jan. 28, 1957        3 Sheets-Sheet 1
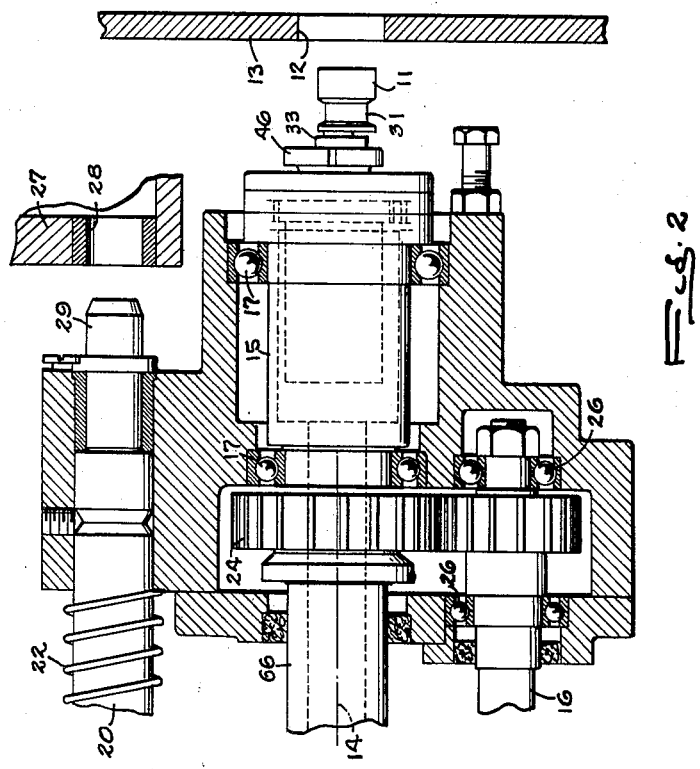
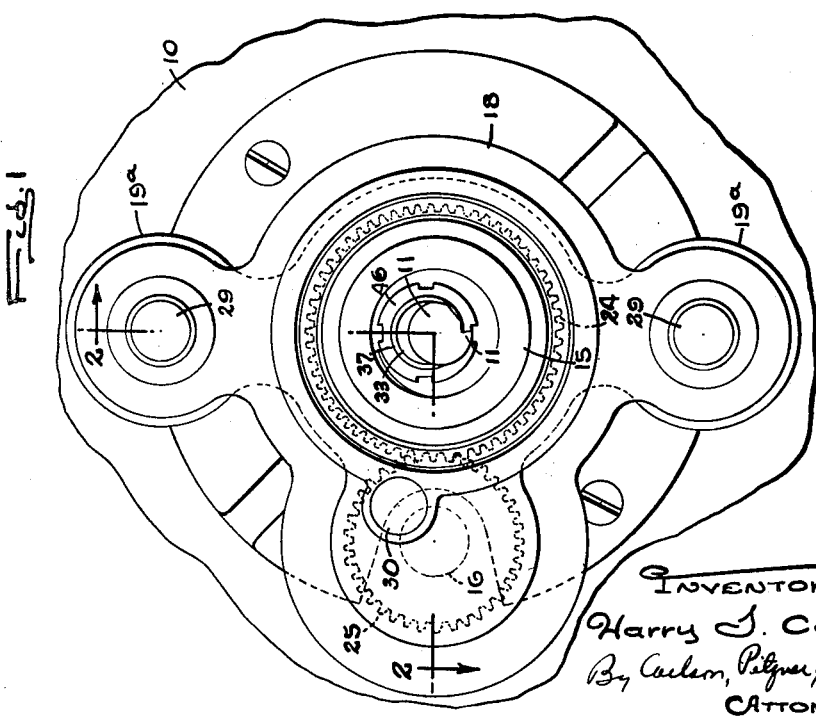
INVENTOR
Harry J. Caldwell

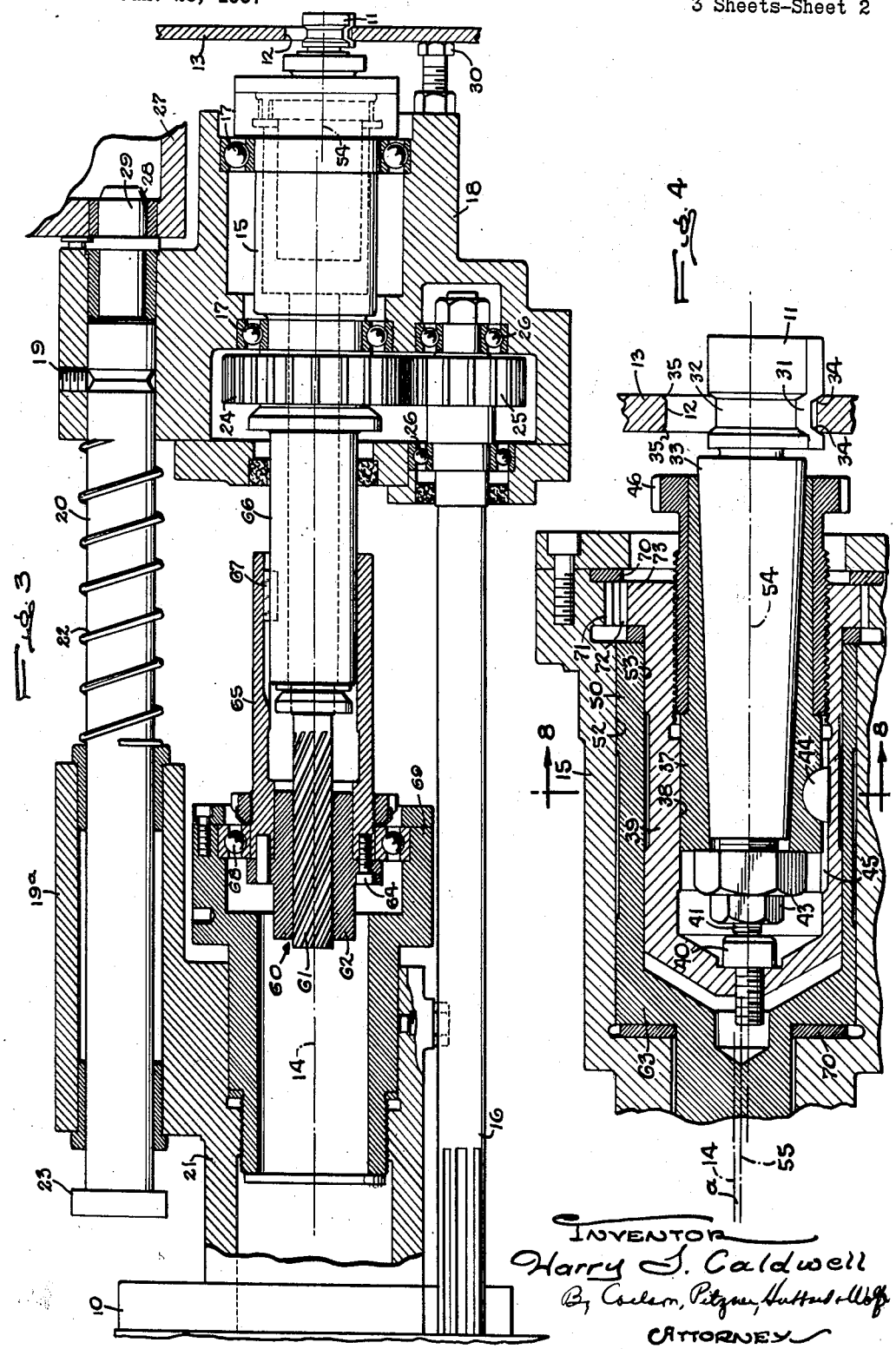

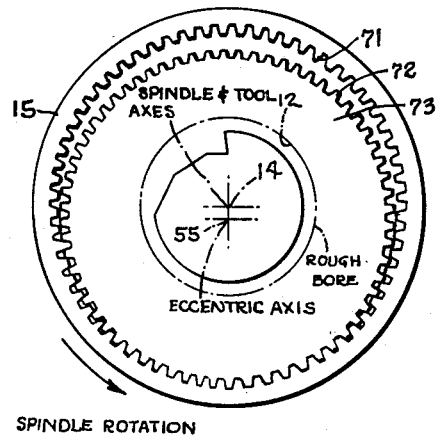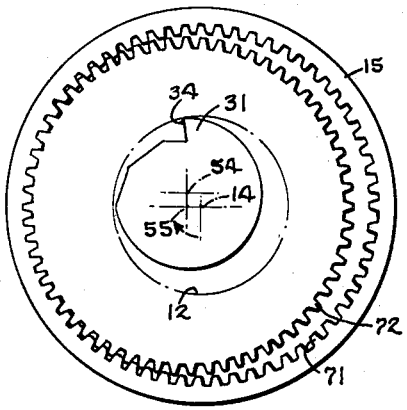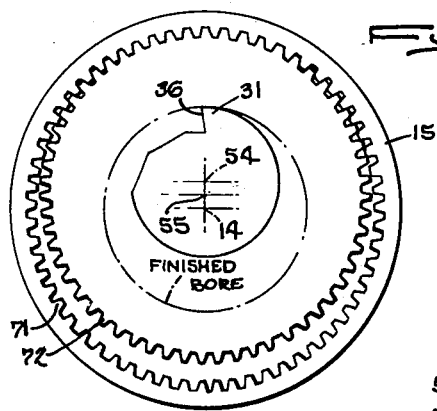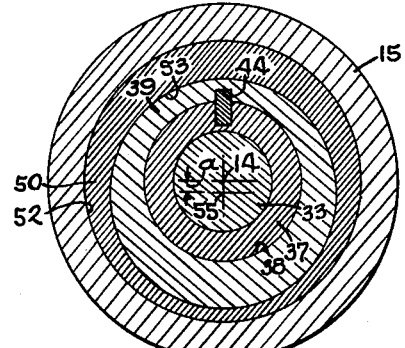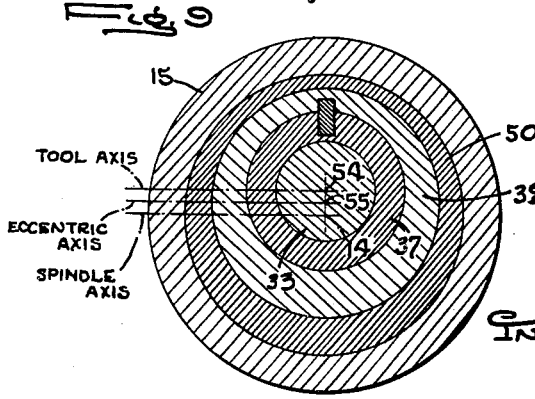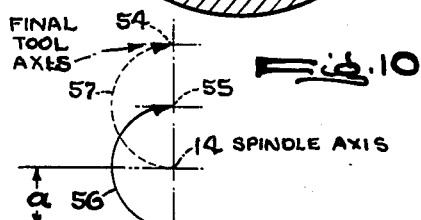

United States Patent Office 2,867,139
Patented Jan. 6, 1959

2,867,139

BORING UNIT

Harry J. Caldwell, Rockford, Ill., assignor to Barnes Drill Co., Rockford, Ill., a corporation of Illinois Application January 28, 1957, Serial No. 636,768

9 Claims. (Cl. 77—3)

This invention relates to the actuation of boring tools for machining grooves, chamfers, or other non-cylindrical contours around the peripheral walls of workpieces by moving the tool axially into the work and feeding the tool radially into and out of the work while the tool mounting is dwelling in the plane of the work surface. In such boring units, the radial feeding motion is derived through an eccentric which is turned relative to the spindle during the latter part of the advancing stroke of a reciprocable actuating head after the cutter tooth has been stopped in the plane of the work surface.

One object of the invention is to provide for mounting and actuation of a boring tool in the manner above described while maintaining the rake angle of the cutter tooth approximately constant during its radial feeding into the work.

Another object is to feed the cutter tooth back and forth radially by relative angular displacement between the rotary spindle and an eccentric while at the same time holding the tooth against substantial turning relative to the spindle.

A further object is to utilize gear teeth in a novel manner in holding the cutter tooth and spindle against turning during the feeding of the tooth by the eccentric.

The invention also resides in the novel mounting of the cutter tooth and the eccentric to simplify the overall construction and facilitate quick replacement and precise repositioning of the tool.

Other objects and advantages of the invention will become apparent from the following detailed description taken in connection with the accompanying drawings, in which Figure 1 is a fragmentary front elevational view of the improved tool unit and the head for actuating the same.

Fig. 2 is a fragmentary section taken along the broken line 2—2 of Fig. 1.

Fig. 3 is a similar view with the tool advanced into the work.

Fig. 4 is an enlarged longitudinal section of a part of Fig. 3.

Figs. 5, 6 and 7 are diagrammatic end views of the work, the tool, and the means for holding the spindle and tool against relative turning.

Figs. 8 and 9 are sections taken along the line 8—8 of Fig. 4 showing the parts positioned to correspond to Figs. 5 and 7.

Fig. 10 is an enlargement of part of Fig. 5 showing the relationship of the spindle eccentric and tool axes.

In the drawings, the invention is shown for purposes of illustration incorporated in a self-contained tool unit reciprocable back and forth with a power actuated head 10 and operable during the advancing stroke of the head to carry a single tooth cutter 11 into a hole 12 to be bored in a suitably supported workpiece 13 and feed the tooth outwardly into the work while the tooth is rotating and dwelling in the plane of the work in the final part of the head advance. The head 10 is reciprocated by a suitable power actuator and slides on ways (not shown) back and forth along the fixed axis 14 of a hollow spindle 15 supporting the tool and rotated by power taken off from a shaft 16 spline coupled to a drive shaft (not shown) mounted on the head 10 and paralleling the spindle axis.

The spindle comprises a hollow sleeve journaled in external bearings 17 carried by a member 18 reciprocable with and also independently of the head 10. Herein the member 18 is a hollow auxiliary head pinned at 19 to two parallel guide rods 20 slidable in ears 19ª which project outwardly from opposite sides of a flange 21 rigid with the forward end of the head 10. Compression springs 22 encircling the rods 20 urge the auxiliary head 18 forwardly and away from the main head 10 to a normal position determined by a stop collar 23 on the rods. Intermediate its ends and adjacent the inner bearing 17, the spindle carries a gear 24 meshing with a pinion 25 fast on the shaft 16 whose forward end is journaled in spaced bearings 26 on the auxiliary head 18. The spindle is thus rotated continuously while the main head 10 is being advanced and retracted.

The workpiece 13 to be bored is clamped in a suitable fixture 27 having holes 28 angularly spaced around the spindle axis and adapted in the advance of the head 10 to receive pins 29 rigid with and projecting from the auxiliary head 18. The latter is thus doweled into an accurately determined angular position. Advance of the auxiliary head is interrupted with the tooth of the cutter 11 disposed in the plane of the hole 12 to be bored. This occurs when an adjustable screw 30 on the auxiliary head 18 comes into abutment against the fixtured workpiece as shown in Fig. 3.

A single tooth 31 of the cutter 11 may be formed integral with and projected radially and outwardly from the outer end 32 of a tapered mounting shank 33. The tooth shown herein for illustration is formed with beveled cutting edges 34 or tips which are adapted during outward feeding of the tooth to cut chamfers 35 at opposite ends of the hole 12. These edges intersect the cutting face 36 which acts at a rake angle which is determined by the position of the cutting face relative to a radius through the edges 34.

To facilitate quick replacement of the cutter with the edges precisely positioned relative to the work plane, the shank 33 is seated in the tapered bore of a sleeve 37 received with a close sliding fit in the cylindrical bore 38 of a cup 39 having a bottom stop adapted for abutment with an adjustable screw 40 projecting along the spindle axis toward the inner end of the shank 33 for abutment with the end of a screw 41 threaded into the end of the shank and held in a precisely determined position by nuts 43. A precise angular position between the sleeve 37 and the cup 39 is established by a key 44 on the sleeve slidable in a keyway 45 in the inner wall of the sleeve. After insertion of the shank assembly into the cup 39 until the end 41 comes against the stop 40, a nut 46 is screwed into the cup thus locking the sleeve securely in the cup. With this arrangement, the spacing of the cutter tooth 31 from the end of the screw 41 may be adjusted in the tool room in a position such that the tooth will be located in the proper axial position relative to the spindle automatically as an incident to insertion of the shank and sleeve assembly in the cup 39.

Radial feeding of the tooth 31 outwardly to bore out the hole 12 is effected by an eccentric 50 disposed within the spindle 15 and normally rotatable therewith but angularly adjustable relative thereto at a rate controlled by the advance of the main head 10. While the eccentric may take various forms, it preferably comprises the sleeve-like open end portion of a cup having an external cylindrical surface journaled in an internal bore 52 formed within the spindle 15 concentric with the axis of the latter. The internal wall 53 of this cup is offset eccentrically relative to the spindle 15 so as to separate the parallel axes 14 and 55 of the spindle and the eccentric by a distance $a$ (Figs. 8 and 10) approximating half of the range through which the cutter tooth is to be fed radially into and out of the wall of the work hole 12.

By offsetting the internal wall 38 of the shank supporting cup 37 eccentrically from the axis of this cup by an amount corresponding to the throw of the eccentric 50, the axis 54 of the tool shank will, when the corresponding parts of the two eccentric cups are disposed on diametrically opposite sides of the spindle axis 14, be disposed substantially coincident with the spindle axis 14 as shown in Figs. 5 and 8. The cutter tooth 31 is thus reacted inwardly and turns with the spindle about the common axis 14. In this centered relation, the rotating tooth will enter the rough work hole 12 properly with a minimum clearance.

Owing to the eccentricity of the cup surface 53 relative to the spindle axis 14, it will be apparent that during turning of the eccentric 50 clockwise from the tooth retracted position shown in Figs. 5 and 8, the eccentric center 55 and the tool center 54 will swing in arcs 56 and 57 (Figs. 5, 6 and 10), the cutter tooth 31 being moved outwardly from its retracted position. After a quarter revolution, the outward feed will about equal the original spacing $a$ of the axes 14 and 55, the tooth and the axes then being disposed as shown in Fig. 6 with the cutting edges engaging the work. Then, as the turning of the eccentric 50 continues, the tool axis 54 and the cutter tip will move on outwardly finally reaching the positions shown in Figs. 7 and 9 if the outward feeding of the tooth is continued to the maximum by turning the eccentric through a full half revolution relative to the spindle. Due to shifting of the tool axis outwardly along the arc 57, the cutting face 36 of the tooth will be shifted laterally somewhat (Fig. 6) and away from its retracted position (Fig. 5). However the angular relation of the face to a radius through the spindle axis is not changed appreciably. As a result, the effective rake or cutting angle of the tooth remains equally effective in all radial positions of the tooth so that machining of the work takes place with uniform cutting efficiency.

The motion for turning the eccentric 50 relative to the spindle 15 is preferably synchronized with the motion of the main head 10 and preferably, as in the present instance, derived from the continued advance of the main head 10 during dwelling of the cutter tooth in the plane of the work hole, this being after the screw 30 on the auxiliary head 18 has come against the workpiece (Fig. 3) in the present instance. This is accomplished through the coaction of a helical spline coupling or screw and nut mechanism 60 having one element, in this instance a high pitch screw 61, rigid with the eccentric and the mating element or nut 62 movable with the main head 10. Herein the screw 61 is formed on a shaft rigid with and projecting inwardly from the bottom 63 of the eccentric cup 50 and centered on the spindle axis 14. The throw of the eccentric and the threads on the screw are correlated to provide the outward feed of the cutter tooth 31 for the available axial movement of the head 10 during dwelling of the auxiliary head 18 after it has encountered the workpiece.

A flange on the exterior of the nut 62 is clamped by screws 64 to one end of a sleeve 65 which telescopes with the extended end portion 66 of the spindle 15 and is spline coupled at 67 (Fig. 3) with the latter. This sleeve is clamped to the inner race ring of a ball bearing 68 whose outer race ring is fastened to a sleeve 69 threaded into the flange 21 on the main head 10.

With the nut 62 thus splined in the spindle 15 to turn therewith and the screw 61 fast on the eccentric 50 but concentric with the spindle axis, it will be apparent that during relative axial movement between the main and auxiliary reciprocable members 10 and 18, the nut will be moved along the screw thus turning the eccentric 50 relative to the spindle through a corresponding angle. Similarly, in the initial retraction of the main head while the auxiliary head is held in advanced position by the springs 22, the nut will be moved reversely along the screw, and the eccentric turned an equal distance in the opposite direction. During these opposite movements of the nut along the screw 61, the resulting thrusts exerted on the eccentric are sustained by thrust washers 70 (Fig. 4).

An important feature of the present invention is the maintenance of the cutting face 36 of the tooth 31 at a substantially constant rake angle while it is being fed outwardly and is in cutting engagement with the work. In addition to the reason given above, this is accomplished by coupling the spindle 15 and the tool shank 33 together in a novel manner permitting bodily radial shifting of the cutter tooth back and forth while being held against substantial relative turning within the spindle. Herein, such coupling is achieved by gears 71 and 72 of different pitch diameters formed on the spindle and tooth shank and meshing with each other on one side of the spindle axis 14 when the cutter tooth is retracted (Fig. 5), the point of meshing progressing angularly around the two gears during the relative angular displacement between the spindle and the eccentric.

Herein, the gears are of the spur type with the teeth 72 cut around the periphery of a flange 73 formed at the outer end of the shank mounting cup 39. The teeth 71 of the larger diameter gear are disposed outwardly beyond the end of the eccentric cup 50 and project inwardly from the spindle 15 adjacent the thrust flange 70. When the cutter tooth 31 is retracted inwardly as shown in Fig. 5, the gear teeth mesh with each other on the side diametrically opposite from the tooth tip 34. As the eccentric is turned within the spindle, the region of meshing of the gear teeth shifts angularly through the position shown in Fig. 6 and, in the position of maximum feed (Fig. 7), the meshing is on the same side of the spindle axis as the cutter tooth.

It will be apparent that the differences in the diameters of the two gears result in a small angular displacement between the cutter spindle and the tool shank as the region of meshing shifts from one side of the spindle axis to the other. However, this displacement is relatively small and does not result in any appreciable change in the angular position of the cutting face 36. The rake angle of the tooth is thus held substantially constant during the outward feeding of the edge into the work during enlargement of the hole 12 therein.

From the foregoing, it will be apparent that a self-contained boring unit has been provided which not only feeds the cutter tooth radially into the work but also maintains the rake angle of the latter substantially constant so as to effect efficient cutting through the operation. At the same time, the extent of the radial feed may be controlled accurately by adjustment of the stroke of the main head 10 after the cutter tooth has entered the work hole and become centered in the plane thereof.

I claim as my invention:

1. A tool having, in combination, a first head reciprocable back and forth along a central axis and through a predetermined range, a second head slidable on said first head along said axis, means engageable with said second head and blocking the advance thereof during the latter part of the advancing stroke of said first head, a hollow power rotated spindle having internal gear teeth and journaled in said second head to turn about said axis, a cup journaled in said spindle concentric with said axis and having an internal bore with its axis offset laterally from said first axis, a tool shank projecting from the open end of said cup and journaled in said cup bore eccentrically thereof with its axis substantially coincident with said spindle axis in one angular position of said cup whereby said shank axis is shifted bodily away from the spindle axis during turning of the cup relative to said spindle, a cutting tooth projecting radially from the projecting end of said shank and having a cutting face disposed at a desired rake angle, external gear teeth on said shank meshing with said spindle teeth on the side of the spindle axis adjacent the cup axis, and means operable during the advance of said first head after blocking of the second head to turn said cup relative to said spindle and thereby feed said cutting tooth outwardly while the latter is held by the meshing teeth against turning relative to the spindle.

2. A tool unit having, in combination, a hollow power rotated spindle having internal gear teeth, a reciprocable head rotatably supporting said spindle, means for advancing said head toward and from an operating position and dwelling the same in such position, a cup journaled in said spindle concentric with the axis thereof and having an internal bore with its axis offset laterally from said first axis, a tool shank projecting from the open end of said cup and journaled in said cup bore for free turning relative thereto and with its axis disposed adjacent said spindle axis in one angular position of said cup whereby said shank axis is swung bodily relative to said spindle axis during turning of the cup relative to said spindle, a cutting tooth projecting radially from the projecting end of said shank and having a cutting face disposed at a desired rake angle, external gear teeth concentric with said shank axis and meshing with said spindle teeth to transmit rotary power to said tool while holding the tool against turning relative to the spindle, and means operable in timed relation to the rotation of said spindle to turn said cup relative to the spindle and thereby feed said cutting tooth outwardly and substantially radially while the latter is held by said gear teeth against substantially turning relative to the spindle.

3. A tool unit having, in combination, a hollow power rotated spindle having internal gear teeth, a member journaled in said spindle concentric with the axis thereof and having a cylindrical surface thereon with its axis paralleling but offset eccentrically from said spindle axis, a tool shank journaled on said cylindrical surface with its axis disposed substantially coincident with said spindle axis in one angular position of said member so as to be shifted bodily away from and toward the spindle axis during the turning of the member relative to said spindle in opposite directions, a cutting tooth projecting radially from the projecting end of said shank on the side thereof remote from the axis of said member, and having a cutting face disposed at a desired rake angle, external gear teeth of smaller pitch diameter than said spindle teeth concentric with said shank axis and meshing with said spindle teeth, a power reciprocated head rotatably supporting said spindle, means for moving said head toward and away from an operating position and dwelling the head in such position, and means for turning said member relative to said spindle during dwelling of said head to thereby feed said cutting tooth outwardly while the latter is held against turning relative to the spindle by meshing of said gear teeth in a region progressing around said spindle axis.

4. A tool unit having, in combination, a hollow power rotated spindle having internal gear teeth, a member journaled in said spindle concentric with the axis thereof and having a cylindrical surface thereon with its axis paralleling but offset eccentrically from said spindle axis so as to shift bodily in an arc around said spindle axis during turning of the member relative to the spindle, a tool shank journaled on said cylindrical surface with its axis disposed adjacent said spindle axis in one angular position of the member but movable toward and away from the spindle axis during turning of said member in opposite directions, a cutting tooth projecting radially from the projecting end of said shank and having a cutting face disposed at a desired rake angle, external gear teeth of smaller pitch diameter than said spindle teeth concentric with said shank axis and meshing with said spindle teeth, a power reciprocated head rotatably supporting said spindle, means for moving said head toward and away from an operating position and dwelling the head in such position, and means for turning said member relative to said spindle during dwelling of said head to thereby feed said cutting tooth outwardly while the latter is held against turning relative to the spindle by meshing of said gear teeth in a region progressing around said spindle axis.

5. A tool unit having, in combination, a head reciprocable back and forth along a central axis, a second member reciprocable along said axis with said head to and from an operating position and dwelling the head in such position, a hollow spindle journaled in said second head to turn about said axis, an eccentric journaled in said spindle concentric with said spindle axis and having a cylindrical surface offset laterally from the spindle axis, a tool shank projecting from said member and journaled on and rotatable freely relative to said cylindrical surface and thus disposed eccentrically thereon so as to be shifted bodily around the axis of said eccentric during turning thereof relative to said spindle and about the axis of the latter, a cutting tooth projecting radially from the projecting end of said shank and having a cutting face disposed at a desired rank angle, means coupling said shank and said spindle for rotation in unison while holding the two against substantial relative turning while permitting said bodily radial shifting of the shank by said eccentric, and means operable during dwelling of said head in said operating position to turn said eccentric relative to said spindle and thereby feed said cutting tooth radially.

6. A tool unit having, in combination, a first head reciprocable back and forth along a central axis and through a predetermined range, a second head slidable relative to said first head along said axis, means engageable with said second head and blocking the advance thereof during the latter part of the advancing stroke of said first head, a hollow spindle journaled in said second head to turn about said axis, a member journaled in said spindle concentric with said axis and having a cylindrical surface thereon with its axis paralleling but offset eccentrically from said spindle axis, a tool shank projecting from and journaled on said cylindrical surface for free turning relative thereto and with its axis paralleling said spindle axis, a cutting tooth projecting radially from the projecting end of said shank, a drive shaft journaled on said first head and projecting therefrom alongside said spindle parallel to the axis thereof, means coupling said shaft to said spindle for turning of the two substantially in unison, means coupling said spindle and shank for turning in unison while holding the two against substantial turning relative to each other, and means operable during the advance of said first head after blocking of the second head to turn said cup relative to said spindle and thereby feed said cutting tooth radially and outwardly while the latter is held against turning relative to the spindle.

7. A tool unit having, in combination, a first head reciprocable back and forth along a central axis and through a predetermined range, a second head slidable with and also relative to said first head along said axis, means operable to hold said second head in a predetermined operating position during the latter part of the advancing stroke of said first head, a hollow spindle journaled in said second head to turn about said axis, a member journaled in said spindle concentric with said axis and having a cylindrical surface thereon with its axis paralleling but offset eccentrically from said first axis, a tool shank projecting from and journaled on said cylindrical surface for free turning relative thereto and with its axis paralleling said spindle axis whereby the shank axis is shifted bodily away from and toward the axis of said member during the turning of the member relative to said spindle in opposite directions, a cutting tooth projecting radially from the projecting end of said shank and having a cutting face disposed at a desired rake angle, means coupling said spindle and said shank together and holding the two against substantial relative turning, and means operable during the advance of said first head after stopping of the second head to turn said member relative to said spindle and thereby feed said cutting tooth outwardly.

8. A tool unit as defined in claim 7 in which said last mentioned means comprises mating screw and nut elements one of the elements rigid with said member and the second element mounted on said first head to turn about said spindle axis and to move back and forth with the head, and a spline coupling joining said second element and said spindle for relative sliding along the spindle axis.

9. A tool unit having, in combination, a hollow power rotated spindle, a reciprocable head rotatably supporting said spindle, means for advancing said head toward and from an operating position and dwelling the same in such position, a cup journaled in said spindle concentric with said axis and having an internal bore with its axis offset laterally from said first axis, a second cup nested and journaled in said bore with its open end projecting from the open end of said first cup, spur gears of different diameters formed around the open end of said second cup and around the interior of said spindle, said gears meshing with each other on one side of said spindle axis, a stop secured to the bottom of said second cup on the interior thereof and having an axially facing abutment surface, a tool shank projecting from the open end of said second cup and closely telescoping therein, an axially adjustable stop projecting from the inner end of said shank for abutment with said first stop when the shank is inserted in said second cup, a cutting tooth projecting radially from the projecting end of said shank and having a cutting face disposed at a desired rake angle, and means operable in timed relation to the rotation of said spindle to turn said first cup relative to the spindle and thereby feed said cutting tooth outwardly while the latter is held by said gear teeth against substantially turning relative to the spindle, said shank stop engaging different areas of said first stop during such turning of said first cup.

References Cited in the file of this patent

UNITED STATES PATENTS 2,585,038     Rogacki _____ Feb. 12, 1952